United States Patent [19]
Tolliver

[11] 3,784,836
[45] Jan. 8, 1974

[54] IR GENERATOR HAVING ELLIPSOIDAL AND PARABOLOIDAL REFLECTORS

[75] Inventor: Peter Marvin Tolliver, Brighton, N.Y.

[73] Assignee: Sybron Corporation, Rochester, N.Y.

[22] Filed: Oct. 6, 1972

[21] Appl. No.: 295,421

[52] U.S. Cl. ............................. 250/495, 250/504
[51] Int. Cl. ........................................ G21h 3/00
[58] Field of Search ................. 250/88, 51.5, 53.1, 250/504, 495; 350/293, 294; 313/110, 111, 114; 240/41.35 R, 41.35 C

[56] References Cited
UNITED STATES PATENTS

| | | | |
|---|---|---|---|
| 3,028,483 | 4/1962 | Simmon | 350/293 |
| 804,996 | 11/1905 | Anthony | 350/294 |
| 2,759,106 | 8/1956 | Wolter | 250/53.1 |
| 2,198,014 | 4/1940 | Ott | 350/294 |
| 2,819,404 | 1/1958 | Herrnring et al. | 250/51.5 |

Primary Examiner—James W. Lawrence
Assistant Examiner—B. C. Anderson
Attorney—Theodore B. Roessel

[57] ABSTRACT

An infrared generator wherein an ellipsoidal reflector has a source rich in infra red at one focus thereof. The end of the reflector at the other focus merges with a paraboloidal reflector positioned so that the focus of the latter reflector coincides with the said other focus of the former. A second ellipsoidal reflector may be inserted between the former said reflectors with one of its foci coinciding with the said other focus of the former said ellipsoidal reflector, and its other focus coinciding with the focus of the paraboloidal reflector. The axes of the reflectors are coincident, and a lens and plug or equivalent may be provided to recover radiation that might otherwise be lost.

10 Claims, 7 Drawing Figures

PATENTED JAN 8 1974 3,784,836

IR GENERATOR HAVING ELLIPSOIDAL AND PARABOLOIDAL REFLECTORS

RELATED APPLICATION

Application for U. S. letters Patent of Peter Marvin Tolliver, Ser. No. 327,693 filed Jan. 29, 1973 assigned to the assignee hereof, and entitled "IR Generator Having Orthogonal Ellipsoidal and Paraboloidal Reflectors."

FIELD OF THE INVENTION

The present invention generally relates to measuring the properties of the nature of a given material as a function of the interaction of said material with infrared (IR) radiation. More particularly, the present invention relates to generating the IR radiation both efficiently and suitable for measuring moisture content of paper web by subjecting the paper to the infra-red radiation and detecting the effect of moisture in the paper on the radiation. Measuring systems of the sort contemplated here are typified by the system described and claimed in U. S. letters Pat. No. 3,551,678 to Richard L. Mitchell.

DESCRIPTION OF THE PRIOR ART

Prior art IR radiation generators in the systems known to me are highly inefficient. Because the basic signal to noise ratio of a system is determined by the generator, such inefficiency is a major source of difficulty in designing a system which will be simultaneously suitable for on-line use of controlling industrial processes, and at the same time accurate. The designer, in effect, is faced with the problem of taking what amounts to a spectro-photometer out of the hospitable environment of the laboratory, and adapting it for use in the rugged, inhospitable environment of the factory, e.g., a paper mill.

It is the object of the present invention to provide, in a system of the Mitchell type, a novel high-efficiency IR radiation generator, so efficient as to increase markedly the measuring capability of the system and, simultaneously, to simplify the system and make it more rugged. It is also a particular object of the invention to provide an IR radiation generator which is efficient, light and compact, is easy and inexpensive to construct, and yet is simple in design, durable and rugged.

SUMMARY OF THE INVENTION

According to the present invention, the novel IR radiation generator comprises one or more ellipsoidal reflective shells in combination with a paraboloidal reflective shell, the focus of the latter being coincident with a focus of the former, and there being an IR-rich source of radiation at another ellipse focus. The source IR radiation is collected by the ellipsoidal shell or shells and the collected radiation is collimated by the paraboloidal shell.

In use according to the aforesaid Mitchell patent, the collimated IR is filtered to produce IR beams having well-defined spectral content. The beams are directed on the paper, or other material, and the system senses what remains of the beams after they have interacted with the paper, and then computes some property or characteristic of the material, for example, moisture content of the paper, that is to say, the percent by weight of liquid water contained in that portion of the paper irradiated by the IR beams. In the present invention, 50 percent or more of the IR from the source is collimated and presented for filtering, an improvement of about one order of magnitude on the prior art.

DESCRIPTION OF THE PREFERRED EMBODIMENTS

Figure 1:
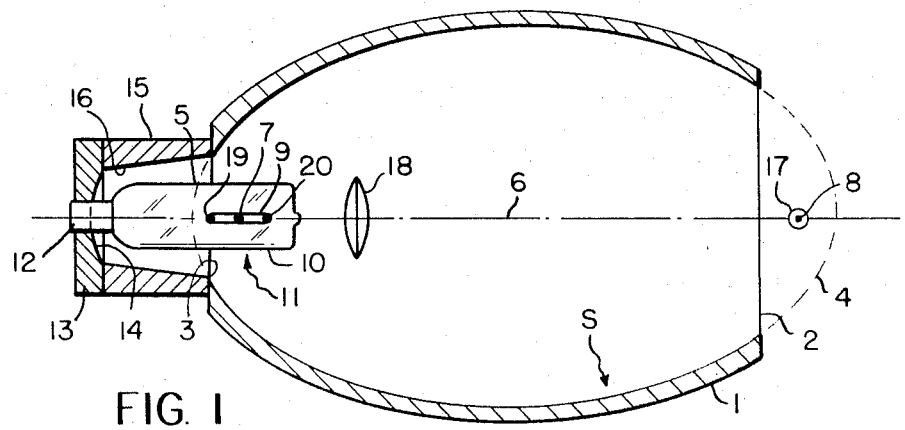
FIG. 1 is a side elevation, in section, of an IR generator according to the invention.

In FIG. 1, reference numeral 1 denotes a shell having internal reflecting surface S coincident with an ellipsoidal surface of revolution of a plane ellipse about its major axis. As will be seen from FIGS. 1, 2 and 3, the shell corresponds to the surface truncated at both ends to define circular apertures. In FIG. 1, the missing ends are identified by dashed line segments 4 and 5, which of course also coincide with the aforesaid ellipse.

The major axis of the ellipse is denoted by reference numeral 6 and the ellipse's foci are denoted by reference numerals 7 and 8. Focus 7 is at the center of a filament 9, the length of which coincides with axis 6, and which is supported in any suitable manner (not shown) in a transparent envelope 10 of a lamp 11, the base 12 of which is supported by a reflector 13 having spherical reflecting surface 14, the radius of which coincides with the axis 6.

Reflector 13 closes the end of a cylinder 15 having an internal, slightly-conical (or right-cylindrical) reflecting surface 16 the axis of which coincides with axis 6. The cylinder 15 and reflector 13 then together close the aperture 3 in shell 1.

For present purposes, lamp 11 may be supposed to be an IR-rich source, when electrically energized to incandescence, as for example, a quartz-iodine lamp, or equivalent. For all practical purposes, the filament 9 provides a cylindrical source of IR-rich radiation. The purpose of the structure thus far described is to reproduce, so to speak, the radiation from the filament as a quasi-point source 17, somewhat as shown in FIG. 1, at focus 8. It is to be understood that the shape of source 17 in any actual case would likely be only approximately as shown, but in any event, as will be seen later, its effective length along the axis 6 will be somewhat less than that of the filament 9, whereas its other dimensions will be more or less close to the cross-sectional dimensions of the filament.

Finally, a converging lens 18 is fixed inside the shell 1 by any suitable means (not shown, but naturally offering as little obstruction as possible to radiation within the shell).

Supposing the surface S to be perfectly smooth and reflective with respect to the desired spectral content of the radiation from filament 9, then it is immediately obvious that when the filament incandesces, a great deal of the resultant radiation will be reflected to focus 8 in the vicinity of which something of an image of filament 9 will be reproduced. Further, were the lens 18 and reflector 13 absent, the radiation in solid angles subtended by apertures 2 and 3, with respect to various points of the filament, would be lost. However, the radius of the surface 14 is such as to focus radiation from the filaments' end point 19 on to lens 18, and the lens 18 is converging lens, dimensioned so as to focus the radiation from reflector 14, and the radiation from the filaments' end point 28, on focus 8. Consequently, the image source 17 will be a somewhat axially-shortened version of filament 9.

In practice, it is found that over 50 percent of the radiation from filament 9 can be reproduced as image source 17. Naturally, for maximum efficiency optimum finish of reflecting surfaces is required. Thus, in the present case, the spectral range of interest went down to 1.8 micron wave-length. In order to achieve specular reflection at this wave-length, a 4 micron layer of gold was plated on surface S after the surface, originally produced by machining it out of a cylinder of brass, had been smoothed as much as possible by machining, buffing and the like.

Since the focus 8 is outside the shell 1, the IR radiation generator of FIG. 1 may be used in accordance with the previously referred to Mitchell patent, wherein the radiation is focussed on filters for the purpose of irradiating material with beams of predetermined spectral content.

According to the present invention, however, the radiation from the image source is collimated by a paraboloidal shell before reaching the detector.

Figure 4:
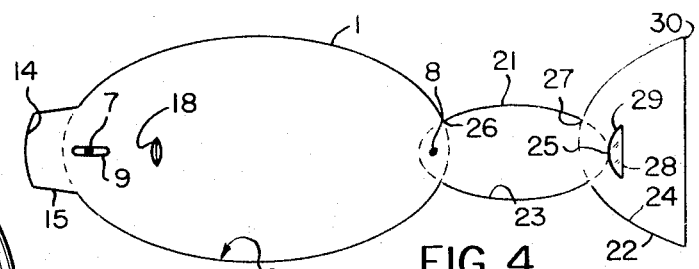
FIGS. 4 through 7 are views like FIG. 1, but of modified forms of the IR generator of FIG. 1.

Thus, the FIG. 4 a shell 21 is coupled to shell 1 through a shell 22, shells 21 and 22 having reflecting surfaces 23 and 24 in the form, respectively, of a ellipsoidal surface of revolution and of an paraboloidal surface of revolution, these surfaces being coaxial with the axis of surface S.

Focus 8 of surface S is one focus of surface 23, the latter's other focus being the focus 25 of the surface 24. Shell 1 and 21 share a common aperture 26, corresponding to, but substantially smaller than, the aperture 2 of FIG. 1, and also shells 21 and 22 share a common aperture 27.

As before, lens 18 is in shell 1 focussing radiation of focus 8. In addition, a reflector 28 having a reflecting surface 29 is supported by any suitable means (not shown) inside shell 22. The reflecting surface is in the form of a hyperboloidal surface of revolution, the axis of which is the axis of surface S and intersects it apex at focus 25.

Figure 5:
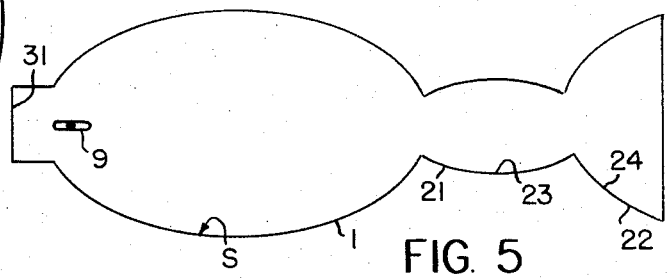
Figure 6:
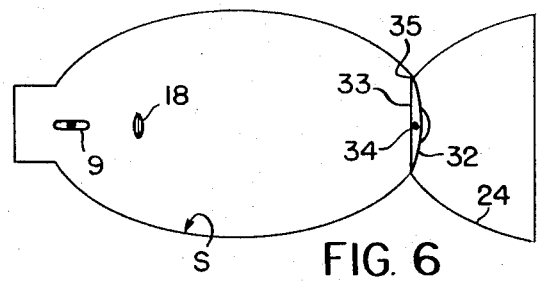

FIG. 5 is essentially FIG. 4 without lens 18 and reflector 28, and FIG. 6 is FIG. 4 without lens 18, shell 21 and reflector 28. The idea of FIG. 4 is to step down shell 1 in order to decrease aperture dispersion, with plug 28 acting to decrease the escape of uncollimated radiation from aperture 27. That is to say, the axial length of shell 22 is quite short, whereas its aperture 30 is quite large, so in the absence of reflector 28, a substantial amount of radiation from surface 23 will fail to strike surface 24, hence, will not become collimated.

In FIG. 5, on the other hand, if the reflector 13 be provided with a plane reflecting surface 31, instead of the spherical surface 14, and if the lens 18 is eliminated, the end point radiation of the filament 9 will be relatively narrow-angle, and hence approximately collimated.

Again, in FIG. 6, the shell 21 is replaced, by its refractor equivalent, lens 32. Lens 32 has a plane surface 33 at which the surfaces S and 24 share the common focus 34, and the common aperture 35. The other surface 36 of lens 32 may be described as a surface of revolution formed by rotating the involute of an ellipse about the axis of its ellipse, in this case, the one corresponding to the surface S.

Figure 7:
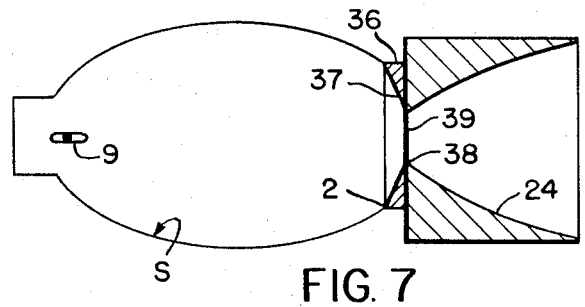

Finally, shell 21 simply may be eliminated, the shell 22 coupled directly to shell 1, so that they share the same aperture. In practice, where shell 1 has been dimensioned for focussing on a filter in front of aperture 8, the aperture will be too large. Accordingly, as shown in FIG. 7, an adapter 36 having a conical reflecting surface 37 couples the aperture 2 of shell 1 to the rather smaller aperture 38 of the paraboloidal surface 24. Surfaces S and 24 share the common focus 39, which is about in the plane of the aperture 38.

Figure 2:
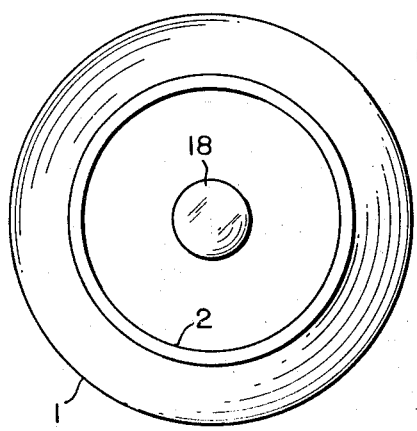
FIGS. 2 and 3 are opposing end elevations of the IR generator of FIG. 1.
Figure 3:
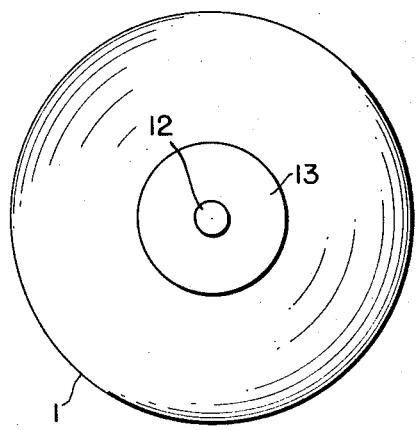

The form of novel IR radiation generator shown in FIGS. 4 through 7 has about the efficiency of the form shown in FIGS. 1, 2 and 3, in terms of how much radiation from filament is finally emitted from the generator. However, from a larger view, the best measure of efficiency is signal to noise ratio at the detector. In the present state of the art, the detector would be a photocell or the like having essentially a plane surface which is perpendicular to the generator axis, and integrates the radiation incident thereon from any direction and produces a corresponding electrical signal. The immediate source of radiation (other than background) for the detector's surface is the material being irradiated by the generator. For best results, this radiation should be normal to the detector surface, and all of it should get to the surface. However, by focussing, as taught by the aforesaid Mitchell patent, such of the radiation as is transmitted through the material is in effect from approximately a point source at the focus 8 of the ellipse, so will have an uneven distribution over the detector surface. Accordingly, collimating the radiation collected by the surface S results in a more uniform distribution of transmitted radiation at the detector surface, and also in less net loss (a point source radiates in a solid angle of one hemisphere so much of it never reaches the detector surface).

From the foregoing point of view, the form of generator shown in FIG. 4 is the most efficient, that is to say, there is greater output of collimated radiation presented for filtering, prior to irradiating the material, the moisture content of which, or whatever, is being measured, than in all the other illustrated forms. However, using the ellipse 21, lens 18, and reflector 28 does complicate the construction, and also makes the generator relatively long, in practice. These consequences may be mitigated by the forms shown in FIGS. 6 and 7, with little enough loss in collimation efficiency that of all the forms illustrated herein, the form shown in FIG. 7 is the embodiment of the invention to be preferred in practice. All forms are substantially equally effective overall in collecting radiation from the filament 9 and directing it out of the open end of the generator, but vary somewhat in their effectiveness in collimating the collected radiation. While some of the filament radiation is lost to heating the generator structure, it can be assumed that practically all of it emerges from the generator, collimated or not.

It is to be observed that the surface S of a shell 1, for any of the forms of IR generator shown, would typically have the actual dimensions shown in FIG. 1. In fact, the Figures are accurate in their relative proportions, with the exception of lenses 18 and 31, surfaces 14, 16 and 24, and plug 28, which due to size are somewhat more approximate. External form of no optical significance may of course be quite unlike what I show herein.

Having described my invention in accordance with the statutes, I claim:

1. In an IR generator, the combination of an ellipsoidal shell having an IR source at one focus thereof, said ellipsoidal shell lacking a minor portion of the end thereof at the other focus thereof, whereby to define an opening in said ellipsoidal shell;

and a paraboloidal shell having its focus substantially coincident with said other focus of said ellipsoidal shell, said paraboloidal shell lacking a portion at the end thereof corresponding to the focus thereof; whereby to define an opening in said paraboloidal shell;

said shells being joined together so that the said openings are substantially coincident, both said interior surfaces being reflective with respect to the radiation from said source;

and whereby the IR radiation is collected by the ellipsoidal shell and the collected radiation is collimated by the paraboloidal shell.

2. The invention of claim 1, wherein said openings are circular.

3. The invention of claim 1, wherein the first said opening is in a plane perpendicular to the major axis of said ellipsoidal shell, and the second said opening is in a plane perpendicular to the axis of said paraboloidal shell.

4. The invention of claim 1, including a plug in the form of the reflective end of a hyperboloidal shell, wherein the point of intersection of said end with the axis of said hyperboloidal shell is coincident with the focus of said paraboloidal shell, and the axes of said paraboloidal and hyperboloidal shells are coincident.

5. The invention of claim 1, including a second ellipsoidal shell having one of its foci coincident with the first said focus of the first said ellipsoidal shell, said second ellipsoidal shell having a radiation source at its other focus, the first said radiation source being the image of the second said radiation source;

the major axes of said ellipsoidal shells being coaxial, so that said ellipsoidal shells intersect in a common plane, and each thereof lacking the lesser part of itself sub-tended by said plane, and the internal surface of said second ellipsoidal shell being reflective with respect to said radiation.

6. The invention of claim 5, including a lens between the foci of said second ellipsoidal shell for focussing a solid angle element of radiation from the second said source on the first said source of radiation, said solid angle being that sub-tended by the said openings.

7. The invention of claim 5, including a plug in the form of the small end of a hyperboloidal shell, wherein the point of intersection of said small end with the axis of said hyperboloidal shell is coincident with the focus of said paraboloidal shell, and the axes of said paraboloidal and hyperboloidal shells are coincident.

8. The invention of claim 5, wherein the said first said ellipsoidal shell has major and minor axes which are shorter than the major and minor axes of said second ellipsoidal shell.

9. The invention of claim 1, including a diverging lens at the coincidence of said openings, said diverging lens being responsive to radiation from said source in a given solid angle to redirect the last said radiation onto the said internal surface of said paraboloidal shell, as if said last said radiation were emanating from the said focus of said paraboloidal shell; said solid angle being that subtended by said openings.

10. In an IR generator, the combination of an ellipsoidal shell and a paraboloidal shell, each having a reflecting inner surface, and said ellipsoidal shell having an IR source at one focus thereof;

said shells being secured together with the other focus of said ellipsoidal shell coincident with the focus of said paraboloidal shell;

said shells lacking portions adjacent where they are secured together, said portions being such as would, by their presence, substantially prevent IR going from said one focus to said inner surface of said paraboloidal shell;

and whereby the IR radiation is collected by the ellipsoidal shell and the collected radiation is collimated by the paraboloidal shell.

* * * * *